United States Patent
Bates et al.

(10) Patent No.: US 9,367,478 B2
(45) Date of Patent: Jun. 14, 2016

(54) CONTROLLING DIRECT MEMORY ACCESS PAGE MAPPINGS

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/281,979

(22) Filed: May 20, 2014

(65) Prior Publication Data

US 2015/0205729 A1 Jul. 23, 2015

Related U.S. Application Data

(63) Continuation of application No. 14/157,593, filed on Jan. 17, 2014.

(51) Int. Cl.
*G06F 12/10* (2006.01)
*G06F 9/455* (2006.01)
(Continued)

(52) U.S. Cl.
CPC ........ *G06F 12/1081* (2013.01); *G06F 9/45533* (2013.01); *G06F 9/45558* (2013.01); *G06F 9/50* (2013.01); *G06F 12/10* (2013.01); *G06F 12/1009* (2013.01); *G06F 13/28* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 5,553,307 A * | 9/1996 | Fujii ............... G06F 12/0804 710/24 |
| 6,314,501 B1 * | 11/2001 | Gulick ............... G06F 9/54 711/153 |
| 6,496,909 B1 * | 12/2002 | Schimmel ............... 711/163 |

(Continued)

FOREIGN PATENT DOCUMENTS

| CN | 102077188 A | 5/2011 |
| WO | 2009158178 A2 | 12/2009 |

OTHER PUBLICATIONS

Wikipedia article on 'Device Driver' archived from Dec. 30, 2013.*
(Continued)

*Primary Examiner* — Steven Snyder
(74) *Attorney, Agent, or Firm* — Richard A. Wilhelm; Feb R. Cabrasawan (57) ABSTRACT

A method for controlling access to a memory of a computer system configured with at least one logical partition may include receiving a first request to map a first page of the memory, the request identifying a first requester. A first logical partition associated with the first page may be determined. It may be determined that an attribute of the first logical partition limits access to individual pages of the first logical partition to a single requester, and that the first page is available to be mapped to a requester. The first page may be mapped to the first requester and a flag indicating that the first page is unavailable for an additional mapping may be set. The first request may be from a device driver on behalf of an input/output adapter, as the first requester, to use the first page in a direct memory access transfer.

18 Claims, 7 Drawing Sheets

(51) Int. Cl.
*G06F 13/28* (2006.01)
*G06F 9/50* (2006.01)

(56) References Cited

U.S. PATENT DOCUMENTS

| | | | |
|---|---|---|---|
| 6,629,162 B1* | 9/2003 | Arndt et al. | 710/28 |
| 6,654,906 B1* | 11/2003 | Arndt | 714/11 |
| 6,820,207 B2* | 11/2004 | Dawkins et al. | 713/324 |
| 6,823,404 B2* | 11/2004 | Arndt et al. | 710/36 |
| 6,829,762 B2* | 12/2004 | Arimilli et al. | 718/1 |
| 6,892,383 B1* | 5/2005 | Arndt | 718/1 |
| 6,938,114 B2* | 8/2005 | Foster et al. | 710/200 |
| 6,941,436 B2* | 9/2005 | Lee et al. | 711/173 |
| 6,973,510 B2* | 12/2005 | Arndt et al. | 710/36 |
| 7,039,692 B2* | 5/2006 | Foster et al. | 709/221 |
| 7,272,671 B2* | 9/2007 | Arndt et al. | 710/23 |
| 7,330,942 B2* | 2/2008 | de Dinechin et al. | 711/152 |
| 7,617,340 B2* | 11/2009 | Gregg | 710/62 |
| 7,752,485 B2* | 7/2010 | Bavaria et al. | 714/2 |
| 7,908,457 B2* | 3/2011 | Arndt et al. | 711/209 |
| 8,458,413 B2* | 6/2013 | Ganti et al. | 711/153 |
| 8,914,587 B2* | 12/2014 | Chang | G06F 12/0246 711/151 |
| 2002/0010811 A1* | 1/2002 | Arndt et al. | 710/5 |
| 2002/0124194 A1* | 9/2002 | Dawkins et al. | 713/310 |
| 2003/0212873 A1* | 11/2003 | Lee et al. | 711/170 |
| 2004/0064601 A1 | 4/2004 | Swanberg | |
| 2004/0073766 A1* | 4/2004 | Arimilli et al. | 711/202 |
| 2005/0055470 A1* | 3/2005 | Arndt et al. | 710/1 |
| 2005/0223127 A1* | 10/2005 | Boutcher et al. | 710/22 |
| 2006/0010276 A1 | 1/2006 | Arndt et al. | |
| 2006/0026383 A1* | 2/2006 | Dinechin et al. | 711/207 |
| 2006/0036830 A1* | 2/2006 | Dinechin et al. | 711/200 |
| 2006/0209724 A1* | 9/2006 | Arndt et al. | 370/255 |
| 2006/0212608 A1 | 9/2006 | Arndt et al. | |
| 2006/0212870 A1* | 9/2006 | Arndt et al. | 718/104 |
| 2006/0253682 A1* | 11/2006 | Armstrong et al. | 711/173 |
| 2006/0288187 A1 | 12/2006 | Burugula et al. | |
| 2007/0136554 A1* | 6/2007 | Biran et al. | 711/203 |
| 2008/0168461 A1* | 7/2008 | Arndt et al. | 718/104 |
| 2009/0037941 A1* | 2/2009 | Armstrong et al. | 719/328 |
| 2009/0144508 A1 | 6/2009 | Freimuth et al. | |
| 2009/0144731 A1* | 6/2009 | Brown et al. | 718/1 |
| 2009/0276605 A1* | 11/2009 | Arndt et al. | 711/209 |
| 2009/0307438 A1* | 12/2009 | Logan et al. | 711/153 |
| 2009/0307439 A1* | 12/2009 | Jacobs et al. | 711/153 |
| 2009/0307440 A1* | 12/2009 | Jacobs et al. | 711/153 |
| 2009/0307445 A1* | 12/2009 | Jacobs et al. | 711/154 |
| 2009/0307690 A1* | 12/2009 | Logan et al. | 718/1 |
| 2009/0307713 A1* | 12/2009 | Anderson et al. | 719/313 |
| 2009/0327643 A1* | 12/2009 | Goodman et al. | 711/173 |
| 2010/0125708 A1* | 5/2010 | Hall et al. | 711/154 |
| 2010/0125709 A1* | 5/2010 | Hall et al. | 711/154 |
| 2010/0161850 A1 | 6/2010 | Otsuka | |
| 2012/0110275 A1* | 5/2012 | Ganti et al. | 711/153 |
| 2012/0216188 A1 | 8/2012 | Tsirkin | |
| 2013/0024648 A1 | 1/2013 | Chen et al. | |
| 2015/0143037 A1 | 5/2015 | Smith | |
| 2015/0205738 A1* | 7/2015 | Bates et al. | |

OTHER PUBLICATIONS

'HMC History Lesson and Firmware Overview' from IBM Systems Magazine, archived from Jun. 2, 2012.*
'Network Virtualization—Breaking the Performance Barrier' by Scott Rixner, Jan./Feb. 2008, ACM Queue.*
Anonymous, "A Method for Direct Memory Access (DMA)," An IP.com Prior Art Database Technical Disclosure, IP.com No. IPCOM000127437D, Aug. 30, 2005. http://ip.com/IPCOM/000127437.
Anonymous, "DMA aware user space memory buffer allocation," An IP.com Prior Art Database Technical Disclosure, IP.com No. IPCOM000225155D, Jan. 28, 2013. http://ip.com/IPCOM/000225155.
IBM, "Logical Partition Security in the IBM eServer pSeries 690", First Edition, Feb. 15, 2002, © International Business Machines Corporation, 2002.
Bates et al., "Controlling Direct Memory Access Page Mappings", U.S. Appl. No. 14/157,593, filed Jan. 17, 2014.
Unknown, "Virtual memory," Wikipedia, last modified Dec. 12, 2014 http://en.wikipedia.org/wiki/Virtual_memory.
Unknown, "Intel Itanium Architecture Software Developer's Manual," Revision 2.3, vol. 2: System Architecture, May 2010, p. 2:55, Copyright © 1999-2010, Intel Corporation.
Unknown, "Device driver," Wikipedia, last modified Dec. 20, 2013 https://web.archive.org/web/20131230094253/http://en.wikipedia.org/wiki/Device_driver.

* cited by examiner

| TRANSLATION ENTRY FORMAT | | | |
|---|---|---|---|
| INDEX OF REAL 4K PAGE (52 BITS) | RESERVED FOR FIRMWARE (10 BITS) | R (1 BIT) | W (1 BIT) |

BITS:  63                              12 11                    2  1          0

FIG. 5

| LPAR | EXCLUSIVE TARGET FOR DMA ATTRIBUTE |
|---|---|
| 1 | DISABLED |
| 2 | ENABLED |
| 3 | DISABLED |

FIG. 8

| LOGICAL PAGE | FLAG (1 BIT) |
|---|---|
| | |

FIG. 6

FIG. 7

CONTROLLING DIRECT MEMORY ACCESS PAGE MAPPINGS

BACKGROUND

The disclosure relates generally to information technology, and more particularly to mapping memory pages used for direct memory address (DMA) transfers between memory and input/output (I/O) devices in a virtualized computer system.

The term "virtualization" may refer to different aspects of computing. In one aspect, hardware virtualization generally refers to methods that allow multiple applications to run concurrently on a computer. Hardware virtualization may be implemented by a hypervisor, which may also be referred to as a virtual machine manager. In another aspect, virtual memory refers to techniques in which virtual addresses are mapped to actual (physical) addresses in the memory of a computer system. With virtual addressing mechanisms, applications are able to address more memory than is physically available in the main memory of the system. In addition, application programming is simplified as applications are not required to manage memory that is shared with other applications.

SUMMARY

Various embodiments are directed to methods for controlling access to a memory of a computer system configured with at least one logical partition. A method may include receiving a first request to map a first page of the memory. The request may identify a first requester. The method may include determining a first logical partition associated with the first page and determining that an attribute of the first logical partition limits access to individual pages of the first logical partition to a single requester. In addition, the method may include determining that the first page is available to be mapped to a requester. Further, the method may include mapping the first page to the first requester and setting a flag to indicate that the first page is unavailable for an additional mapping.

In various embodiments, the first request is received from a device driver on behalf of an input/output adapter and the first requester is the input/output adapter. In various embodiments, the first page is requested for use in a direct memory access (DMA) transfer. In addition, a method may include processing a DMA access request from the first requester. The DMA access request may specify the first page. Moreover, a method may include rejecting a DMA access request from a second requester. Again, the DMA access request may specify the first page. In some embodiments, the determining that the first page is available to be mapped to a requester may include reading a target exclusive page flag stored in a target exclusive page table. In other embodiments, the determining that the first page is available to be mapped to a first requester may include reading a target exclusive page flag stored in a translation control entry table. Further, the request may identify a first logical address of the first page, and the determining the first logical partition associated with the first page may include translating the first logical address into a first physical address.

Various embodiments are directed to a system that includes a processor, a memory, at least one input/output adapter, and a hypervisor. The hypervisor may be configured to receive a first request to map a first page of the memory for use in a direct memory access (DMA) transfer operation. The request may identify a first component. The hypervisor may be additionally configured to determine a first logical partition associated with the first page, and to determine that an attribute of the first logical partition limits access to individual pages of the first logical partition to a single component. Further, the hypervisor may determine that the first page is available to be mapped. The hypervisor may map the first page to the first component and set a flag to indicate that the first page is unavailable for an additional mapping.

In various embodiments directed to a system, the first request is received from a device driver on behalf of an input/output adapter and the first component is the input/output adapter. In various embodiments, the hypervisor processes a DMA access request from the first component. The DMA access request may specify the first page. In various embodiments, the hypervisor rejects a DMA access request from a component other than the first component. Again, the DMA access request may specify the first page. In some embodiments, the hypervisor may determine that that the first page is available to be mapped by reading a target exclusive page flag stored in a target exclusive page table. In other embodiments, the hypervisor may determine that the first page is available to be mapped includes reading a target exclusive page flag stored in a translation control entry table.

Yet other embodiments are directed to a computer readable storage medium having instructions stored thereon for controlling access to a memory which, when executed, cause a processor to perform various operations. The operations may include receiving a first request to map a first page of the memory. The request may identify a first requester and specify that the first page is requested for use in a direct memory access (DMA) transfer. In addition, the operations may include determining a first logical partition associated with the first page, and determining that an attribute of the first logical partition limits access to individual pages of the first logical partition to a single requester. Further, the operations may include determining that the first page is available to be mapped to a requester. Additionally, the operations may include mapping the first page to the first requester and setting a flag to indicate that the first page is unavailable for an additional mapping.

DETAILED DESCRIPTION

A hypervisor may not prevent two or more components, such as I/O adapters, firmware, or virtual I/O servers from mapping the same page of memory for use in DMA transfers. Allowing two or more components to map the same page is sometimes desirable, but at other times it is not desirable. For example, a bug (defect) can occur when multiple mappings are allowed and DMA writes from two or more components conflict with one another. These bugs are generally difficult to find. According to various embodiments, methods and systems are provided for controlling access to a page of memory of a logical partition. When a request to map a page of memory for use in a DMA transfer operation is received, a logical partition associated with the page is determined. Once the logical partition is known, it is determined whether an attribute of the logical partition limits access to individual pages of the logical partition to a single requester, such as a single input/output adapter or other component. If the logical partition limits access, it is determined whether the page is available to be mapped to a component, i.e., the page has not already been mapped. If the page is available, the page is mapped to the requester. In addition, a page exclusivity attribute or flag may be set to indicate that the page is unavailable for an additional mapping. This ensures that the requester has exclusive access to the page. Exclusivity is maintained until the page exclusivity flag is reset to indicate that the page is available.

Each logical partition may have an exclusive target for DMA (ET for DMA) attribute, which may be stored in an exclusive target table. If the ET for DMA attribute of the logical partition limits access to individual pages of the partition to a single requester, a target exclusive page table is provided for the logical partition. Page exclusivity attributes or flags may be stored in the target exclusive page table. In alternative embodiments, page exclusivity may be maintained using a bit of an entry of a TCE table or a bit of an entry of a page translation table. If a DMA write request is received for a logical partition having the ET for DMA attribute enabled, and the request specifies a page that has been exclusively mapped (i.e., the page exclusivity attribute is set) to a component, such as an input/output adapter, the request is only processed if the requester is the exclusively-mapped component. The DMA write request is rejected if the requester is a component other than the exclusively-mapped component.

Figure 1:
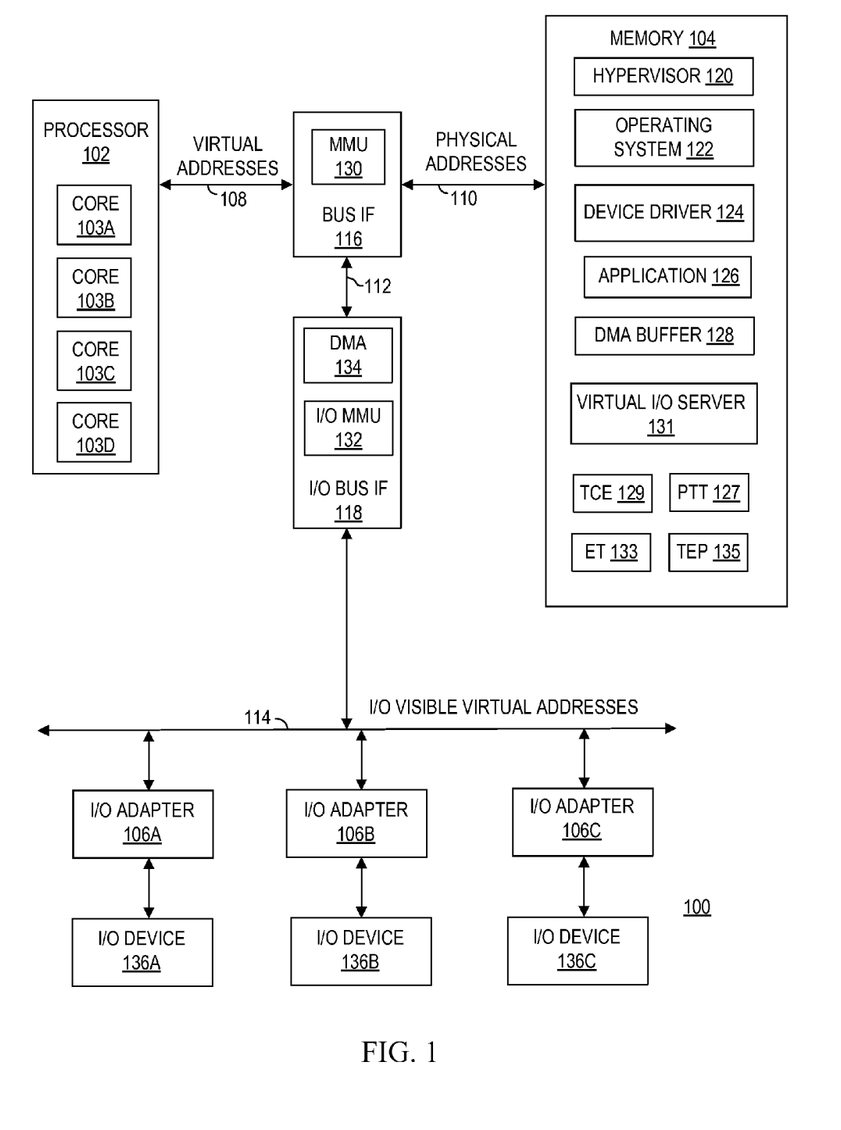
FIG. 1 depicts a block diagram of an exemplary computer system in which various embodiments of the invention may be implemented.

FIG. 1 depicts a high-level block diagram of an exemplary computer system 100 for implementing various embodiments. The mechanisms and apparatus of the various embodiments disclosed herein apply equally to any appropriate computing system. The major components of the computer system 100 may include one or more processors 102, a memory 104, one or more input/output (I/O) adapters 106A-106C, all of which are communicatively coupled, directly or indirectly, for inter-component communication via a host bus 108, a memory bus 110, a bus 112, an I/O bus 114, a bus interface unit (IF) 116, and an I/O bus interface unit 118.

The computer system 100 may contain one or more general-purpose programmable CPUs, herein generically referred to as the processor 102. In an embodiment, the computer system 100 may contain multiple processors 102; however, in another embodiment, the computer system 100 may alternatively include a single CPU. Each processor 102 executes instructions stored in the memory 104 and may include one or more levels of on-board cache. Each processor 102 may include one or more cores 103, e.g., cores 103A-103D.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor 102. Memory may be further distributed and associated with different CPUs or sets of CPUs, as is known in any of various so-called non-uniform memory access (NUMA) computer architectures.

The memory 104 may store all or a portion of a hypervisor 120, one or more operating systems 122, one or more device drivers 124, and one or more application programs 126. A device driver 124 may be a computer program that controls a particular device using low-level commands that the device understands. The device driver 124 may translate higher-level application code to low-level, device-specific commands. In addition, a portion of the memory 104 may be allocated for one or more DMA buffers 128, one or more page translation tables (PTT) 127, one or more translation control entry (TCE) tables 129, an exclusive target (ET) table 133, and a target exclusive page (TEP) table 135. Further, the memory 104 may store a virtual I/O server 131. These programs and data structures are illustrated as being included within the memory 104 in the computer system 100, however, in other embodiments, some or all of them may be on different computer systems and may be accessed remotely, e.g., via a network.

The computer system 100 may use virtual addressing mechanisms that allow the programs of the computer system 100 to behave as if they only have access to a large, single storage entity instead of access to multiple, smaller storage entities. The processor 102 and various devices, such as the I/O adapters 106A-106C, may use virtual addresses that are translated into physical addresses in the memory 104. Thus, while the hypervisor 120, operating systems 122, application programs 126, device drivers 124, DMA buffers 126, PTT tables 127, TCE tables 129, ET table 133, TEP table 135, and virtual I/O server 131 are illustrated as being included within the memory 104, one or more of them are not necessarily all completely contained in the same storage device at the same time. Further, although the modules, units, and databases of the hypervisor 120, operating systems 122, application programs 126, device drivers 124, DMA buffers 128, PTT tables 127, TCE tables 129, ET table 133, TEP table 135, and virtual I/O server 131 are illustrated as being separate entities in FIG. 1, in other embodiments some of them, portions of some of them, or all of them may be packaged together.

In an embodiment, the modules, units, and databases of the hypervisor 120, operating systems 122, application programs 126, device drivers 124, and virtual I/O server 131 may include instructions or statements that execute on the processor 102 or instructions or statements that are interpreted by instructions or statements that execute on the processor 102 to carry out the functions as further described below. In another embodiment, the modules, units, and databases of the hypervisor 120, operating systems 122, application programs 126, device drivers 124, and virtual I/O server 131 are implemented in hardware or firmware via semiconductor devices, chips, logical gates, circuits, circuit cards, and/or other physical hardware devices in lieu of, or in addition to, a processor-based system. In an embodiment, the modules, units, and databases of the hypervisor 120, operating systems 122, application programs 126, device drivers 124, and virtual I/O server 131 may include data in addition to instructions or statements.

The bus interface unit 116 may handle communications among the processor 102, the memory 104, and the I/O bus interface unit 118. The bus interface unit 116 may include a memory management unit (MMU) 130. The MMU 130 handles memory requests for the processor 102. The MMU 130 may translate processor-visible virtual addresses to physical addresses of the memory 104. In addition, one or more of the functions provided by the bus interface unit 116 may be on board an integrated circuit that also includes the processor 102.

The I/O bus interface unit 118 may be coupled with the I/O bus 114 for transferring data to and from the various I/O units. The I/O bus interface unit 118 may communicate with multiple I/O adapters 106A, 106B, and 106C, which are also known as I/O processors (IOPs) or I/O interface units, through the I/O bus 114. The I/O bus interface unit 118 may include an I/O MMU 132 and a DMA unit 134. The I/O MMU 132 translates virtual addresses visible to various I/O devices to physical addresses of the memory 104. The DMA unit 134 may be used to transfer data between the memory 104 and the memory of any of the I/O adapters 106A-106C. The DMA 134 may provide two or more DMA channels.

The I/O adapters 106 may support communication with a variety of storage and I/O devices 136A-136C. In addition, the I/O adapters 106A-106C may support the attachment of one or more disk drives or direct access storage devices. The I/O adapters 106A-106C may support the attachment of solid state memory devices. The I/O adapters 106A-106C may provide an interface to any of various other I/O devices or devices of other types, such as printers or fax machines. The I/O adapters 106A-106C may provide one or more communication paths from the computer system 100 to other digital devices and computer systems; these communication paths may include one or more networks. In various embodiments, an I/O adapter 106 may be a device for connecting SCSI, Fibre Channel, or eSATA devices. In various embodiments, an I/O adapter 106 may be a device for connecting to IDE, Ethernet, Firewire, PCIe, or USB buses. In an embodiment, an I/O adapter 106 may be a host Ethernet adapter.

Although the computer system 100 shown in FIG. 1 illustrates a particular bus structure providing a direct communication path among the processors 102, the memory 104, the bus interface 116, and the I/O bus interface unit 118, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 118 and the bus interface unit 116 are shown as single respective units, the computer system 100 may, in fact, contain multiple I/O bus interface units 118 or multiple bus interface units 116. While multiple I/O devices 136 are shown as being coupled to the I/O bus 114 via various communications paths running through I/O adapters 106, in other embodiments, some or all of the I/O devices are connected directly to one or more system I/O buses.

Figure 2:
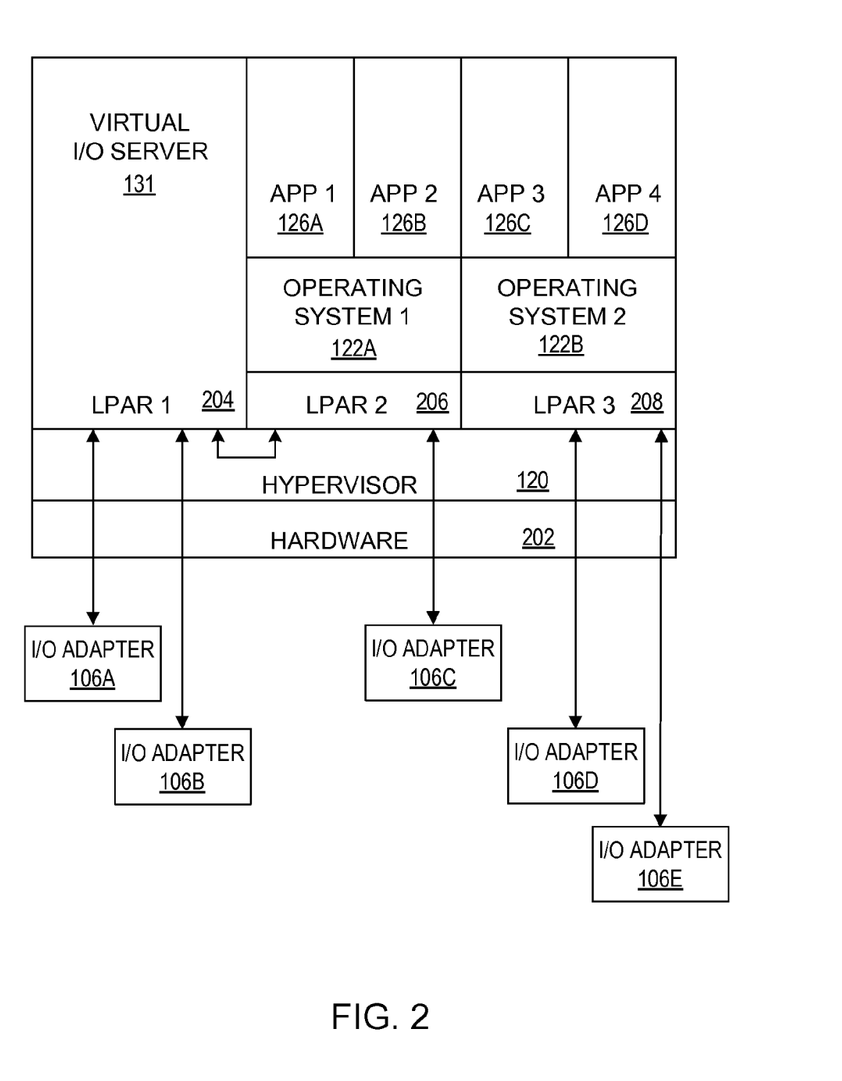
FIG. 2 is a block diagram showing a view of the computer hardware, hypervisor, operating systems, applications, and I/O adapters of the computer system of FIG. 1 in a virtualized environment, according to various embodiments.

FIG. 2 is a block diagram showing a view of the computer hardware 202, hypervisor 120, operating systems 122, applications 126, and I/O adapters 106 of the computer system 100 of FIG. 1 in a virtualized environment, according to various embodiments. The hardware 202 may include the processor 102, memory 104, buses 114, and various other components of the computer system 100. In FIG. 2, the hypervisor 120 is used to implement logical partitions (LPAR) 204, 206, and 208. Applications APP1, 126A and APP2, 126B run under operating system 1, 122A in LPAR 2, 206. Applications APP3, 126C and APP4, 126 D run under operating system 2, 122B in LPAR 3, 208. The virtual I/O server 131 operates in LPAR 1, 204.

Figure 3:
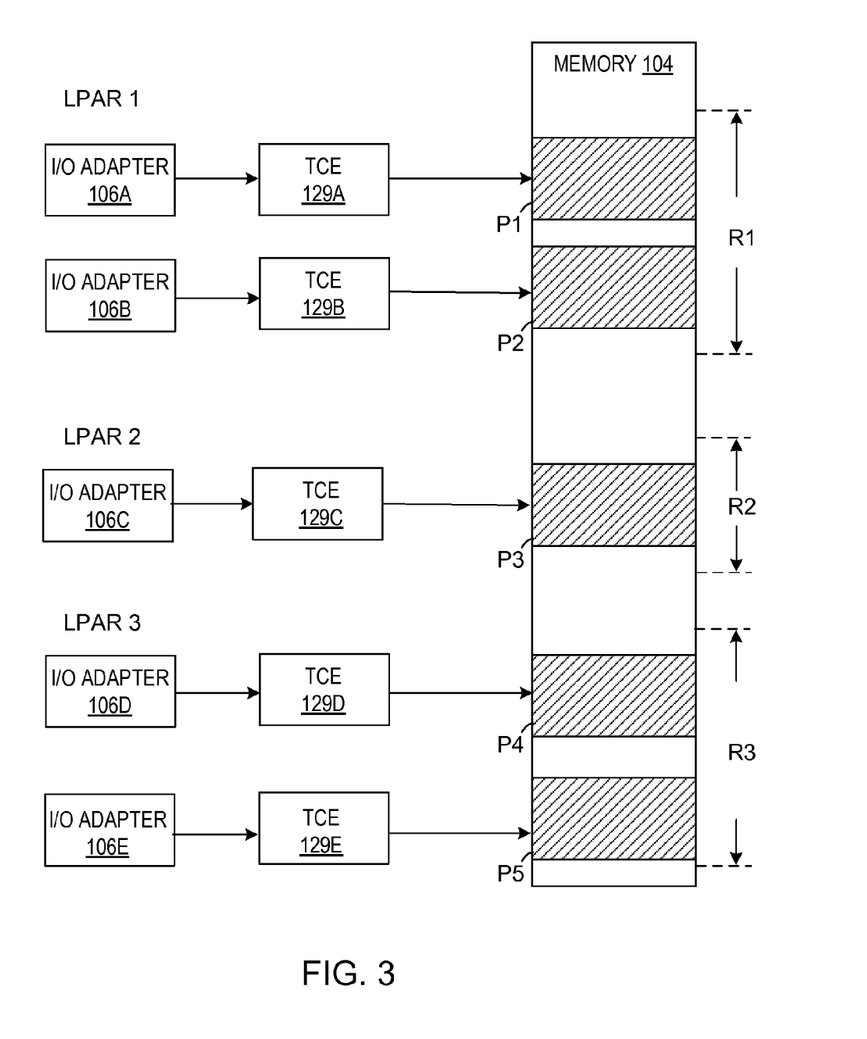
FIG. 3 is a diagram of an alternative view of the memory, TCE tables, and I/O adapters of the computer system of FIG. 1, according to various embodiments.
Figure 4:
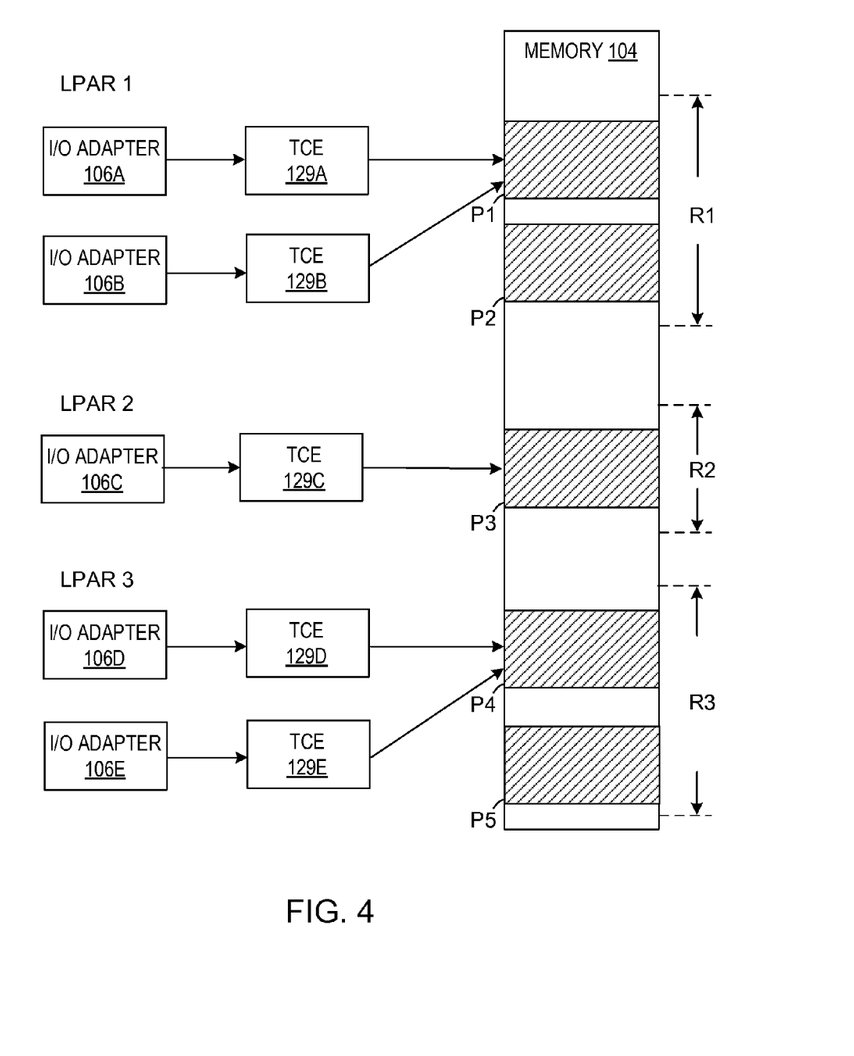
FIG. 4 is a diagram of the memory, TCE tables, and I/O adapters of the computer system of FIG. 3 showing an alternative mapping of the I/O adapters to the memory, according to various embodiments.

FIGS. 3 and 4 are diagrams showing an alternative view of the memory 104, TCE tables 129A-129E, I/O adapters 106A-106E of the computer system 100 of FIG. 1, according to various embodiments. As shown in FIG. 3 and, in various embodiments, one TCE table 129 may be provided per I/O adapter 106. FIGS. 3 and 4 are used to explain the use of the TCE tables 129 and the mapping between I/O adapters 106 and memory 104. While the TCE tables 129A, 129B, 129C, 129D, and 129E are depicted as being outside the memory 104, this is to clarify their use; in practice, the TCE tables 129 are stored in the memory 104. FIGS. 3 and 4 show a type of map of the memory 104 commonly used in the art. Maps of this type may include multiple rows, with each row corresponding to a memory location. Each row has an address with the bottom row corresponding with the lowest possible address and the top row with the highest possible address. In FIGS. 3 and 4, diagonally striped regions P1-P5 represent pages in memory, which may be a range of 4K of addresses. In FIGS. 3 and 4, a first range R1 of addresses has been allocated for use by the LPAR 1, a second range R2 of addresses has been allocated for use by the LPAR 2, and a third range R3 of addresses has been allocated for use by the LPAR 3.

Data may be moved (read or written) between the system memory 104 and the I/O adapters 106 using DMA. An I/O adapter uses virtual addresses when it makes a DMA transfer. The virtual addresses are translated into physical addresses using a translation control entry (TCE) table 129. Specifically, in DMA operations, address translations for the I/O adapters 106A, 106B, 106C, 106D, or 106E use the adapter's respective TCE table 129A, 129B, 129C, 129D or 129E. Host bridge hardware, e.g., I/O MMU 132, uses a TCE table 129 to convert I/O bus logical addresses to physical real addresses.

Figure 5:
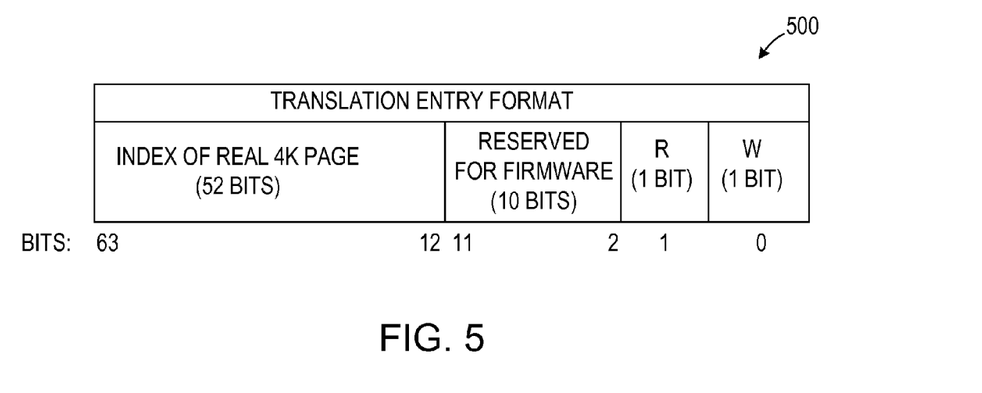
FIG. 5 illustrates a format of an entry in a translation control entry table according to various embodiments.

FIG. 5 illustrates the format of an entry 500 in a TCE table 129. In various embodiments, each entry in a TCE 129 is 64 bits. Bits 12-63 contain the translation of an I/O bus page address to a memory page address. Memory and I/O pages may be 4K in size. Bits 2-11 are reserved for firmware control. Bits 1 and 0 are, respectively a read access bit, which, if set, authorizes an I/O adapter to read system memory, and a write access bit, which, if set, authorizes an I/O adapter to write to system memory. Some embodiments do not increase the number of bits required for entry 500 in a TCE table 129, which may be an advantage.

FIG. 4 shows an alternative mapping of the I/O adapters 106A-106E to the memory 104 of FIG. 3, according to various embodiments. As shown in FIG. 4, both of the I/O adapters 106A and 106B are mapped to the same memory page P1. In addition, both of the I/O adapters 106D and 106E are mapped to the same memory page P4.

There are situations where mapping two or more I/O adapters to a single page is advantageous for performance reasons. For example, statically mapped pages avoid the overhead associated with remapping pages on an as-needed basis.

However, in other situations, mapping two or more I/O adapters to a single page causes problems. DMA write operations from two I/O adapters may conflict with one another, causing corruption of the data stored in the common page. These types of problems may be highly dependent on timing, and as such, may be difficult to correct.

Generally, in a non-virtualized system, i.e., one without LPARs, the operating system 122 creates and maintains the entries in the TCE tables 129. However, in a virtualized system, i.e., one with LPARs, entries the TCE tables 129 are managed differently. In virtualized systems, TCE tables 129 are only accessible by the hypervisor 120. When an operating system 122 needs to create or modify an entry in a TCE table 129, it must issue a hypervisor call, which may include as an argument a "logical real" address of the operating system. (From the perspective of the operating system the argument is a real address, however, the argument is in fact a logical address.) The hypervisor 120 translates the "logical real" address of the client operating system 122 into a "physical real" address that the I/O hardware can understand. The hypervisor 120 also enforces an isolation mechanism that prevents an operating system 120 from setting up a mapping to a region of memory 104 not allocated to it. However, the hypervisor 120 permits an individual I/O adapter 106 to be mapped to two or more partitions. In addition, in various embodiments, the hypervisor 120 does not prevent two different I/O adapters 106 that both belong to the same operating system 122 from mapping to the same page of memory. This last feature is illustrated in FIG. 4.

Correctly-written device drivers may avoid problems caused by conflicting writes by multiple I/O adapters. However, system firmware, such as a flexible service processor (FSP) may be allowed to perform DMA write operations into the same page that is mapped to an I/O adapter. (FSP provides diagnostics, initialization, configuration, run-time error detection and correction. FSP connects a computer system to a hardware management console.) An FSP may have its own TCE table. An operating system 122 or the firmware itself may request the hypervisor 120 to map a page for DMA transfers by the firmware. Mappings by these components are not controlled by a device driver 124. In addition, the virtual I/O server 131 may establish its own DMA mappings. Accordingly, a correctly-written device driver 124 would not prevent a page conflict with firmware or virtual I/O server mappings. Thus, there are multiple entities, each with its own code base, that may establish a DMA mapping to a same page, and a bug in any entity may corrupt important data.

According to various embodiments, a computer system 100 includes an exclusive target (ET) table 133. The ET table 133 is used to store an exclusive target for DMA (ET for DMA or ET DMA) attribute for each LPAR. The ET DMA attribute may be used to control access by multiple requesters e.g., multiple I/O adapters, to the same page in memory. If an LPAR has its ET DMA attribute enabled, the hypervisor 120 will allow a single logical page to be mapped to a maximum of one requester, e.g., one I/O adapter 106, for DMA write purposes. A user may wish to enable the ET DMA attribute for an LPAR in a development environment for debug purposes. In addition, a user may wish to enable the ET DMA attribute on critical LPARS. The user may wish to disable the ET DMA attribute for performance-sensitive or minimal-memory LPARS.

Figure 8:
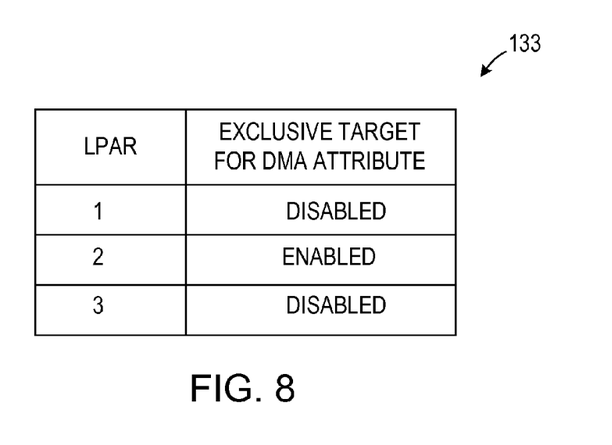
FIG. 8 illustrates an exclusive target table according to various embodiments.

FIG. 8 illustrates an ET table 133 according to an embodiment. As shown in FIG. 8, the ET table 133 may include a field to identify the LPAR and a field for an associated ET DMA attribute.

Figure 6:
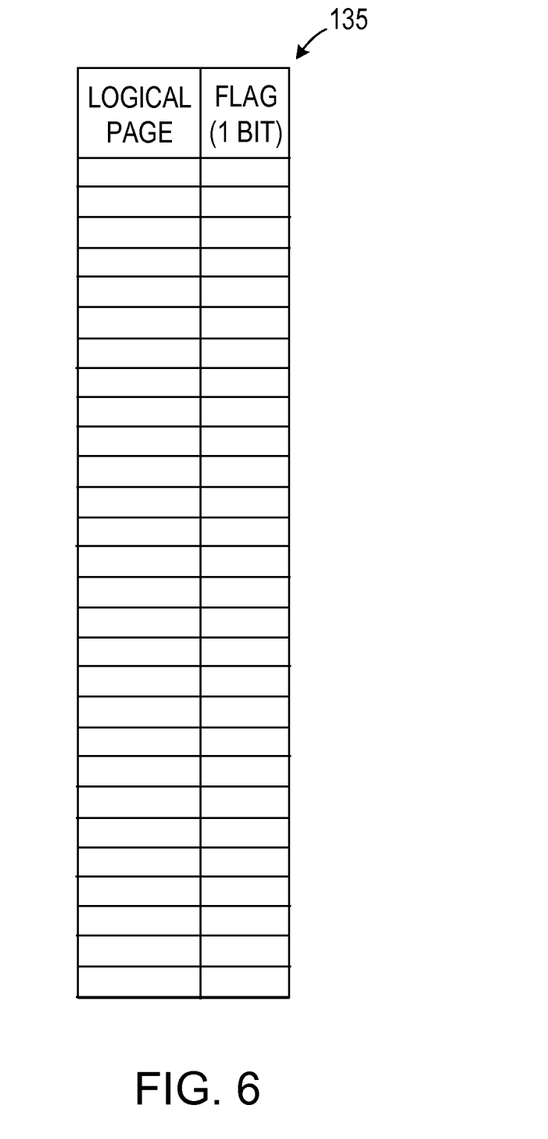
FIG. 6 illustrates a target exclusive page table for a logical partition according to an embodiment.

Page exclusivity may be maintained in several ways. In various embodiments, page exclusivity may be maintained using a target exclusive page table (TEP) 135. FIG. 6 depicts one example of a TEP table 135. In one embodiment, the TEP 135 includes a field to identify each logical page in an LPAR and an associated bit to store a page exclusivity attribute or flag for the page. In another embodiment, the field to identify logical pages may be eliminated and the identification of logical pages may be determined implicitly from the sequential position of the page exclusivity flag in the table. This embodiment would require one (1) bit of hypervisor storage per 4 Kbytes of virtual machine memory, for an overhead of 0.003%, which may generally be much better than the overhead for the DMA translation table, e.g., 1.95%.

In an alternative embodiment, page exclusivity may be maintained using a bit of the TCE entry. For example, one bit of the translation index (bits 12-63 of FIG. 5) may be used for the TEP flag. In another alternative, one bit of a page translation table (PTT) 127 entry may be used for the TEP flag.

According to various embodiments, the ET DMA attribute may be changed in a virtual machine power off/on cycle, i.e., an LPAR power off/on cycle. In a virtual machine power off/on cycle, the TCE table 129 may be reset so that it is in a known state, e.g., no I/O adapter mappings. Once the TCE table 129 is in a known state, the ET DMA attribute may be enabled for the LPAR. Alternatively, in various alternative embodiments, the hypervisor 120 may perform a search of all mappings in all TCE tables 129 before accepting a request to enable the ET DMA attribute for an LPAR. If the search does not identify any pages as being mapped to multiple I/O adapters, the hypervisor 120 would enable the requested ET DMA attribute for the LPAR.

When an operating system, an I/O adapter (via a device driver), or a firmware component (all of which may be referred to collectively, as "components") seeks to establish a DMA write-capable mapping, it makes a hypervisor call to request that the hypervisor put the mapping in the corresponding TCE table 129 for the component. The hypervisor call is necessary because TCE tables 129 are only accessible by the hypervisor 120 in virtualized systems. The operating system 122, device driver 124 (on behalf of an I/O adapter), or firmware component may seek to establish a DMA write-capable mapping at any time. For example, an operating system 122, device driver 124 (on behalf of an I/O adapter), or firmware component may request a mapping at initialization time or at the time a particular DMA operation is being set up.

Figure 7:
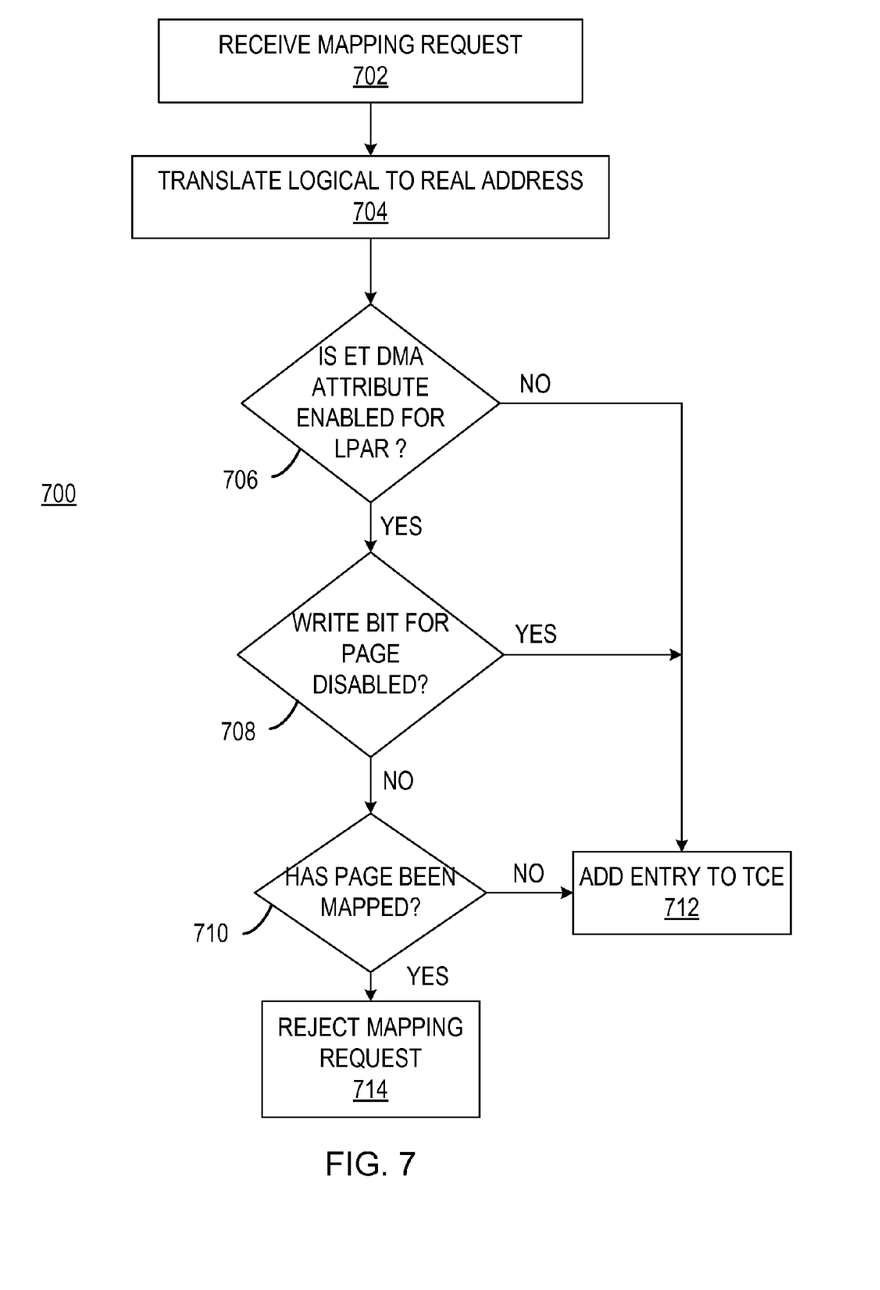
FIG. 7 is a flow diagram of a method for processing a mapping request according to various embodiments.

FIG. 7 shows a flow chart of a method 700 for processing a mapping request according to various embodiments. In operation 702, a mapping request is received by a hypervisor 120. The requester may be an operating system, an I/O adapter, firmware, or other component. The request may be received directly from a requester or indirectly, such as when the requester is an I/O adapter and a device driver makes the request on behalf of the I/O adapter. (Note that while, technically, a device driver makes requests for page mappings and an I/O adapter does not make requests for page mappings, an I/O adapter is nonetheless included within the meaning of the term "requester" as that term is used in the claims.) When the hypervisor 120 receives the mapping request, it translates the "logical real" address of the page into a physical one (operation 704). The hypervisor 120 then determines which LPAR the physical address is allocated to and whether the ET DMA attribute for that LPAR is enabled (operation 706). If the ET DMA attribute is not enabled, the hypervisor 120 adds an entry to the TCE table for the requester (operation 712). However, if the ET DMA attribute is enabled, the hypervisor 120 examines at least the write bit of the proposed entry contained in the request (operation 708). In various embodiments, the hypervisor 120 may additionally examine both the read and write access bits of the proposed entry contained in the request. If the write bit is disabled, the hypervisor 120 adds an entry to the TCE table (operation 712). However, if the write bit is enabled, the hypervisor 120, the hypervisor 120 determines whether the page has previously been exclusively mapped to a requester, e.g., an I/O adapter 106 (operation 710). The hypervisor 120 may determine whether the page has been previously mapped from the target exclusive page (TEP) table 135. If the page exclusivity flag in the TEP 135 is set for the page, then the page is exclusively associated with a particular requester, e.g., an I/O adapter 106, and the hypervisor 120 rejects the mapping request (operation 714). In addition, the hypervisor 120 may return an error code to the requester, e.g., an operating system, device driver for an I/O adapter, firmware, or other component. If the page is not exclusively associated with a particular requester, the hypervisor 120 atomically sets a flag indicating that the page has been exclusively mapped to the requesting entity, e.g., an I/O adapter 106. The hypervisor 120 may then insert the entry into the TCE table 135 (operation 712).

In various embodiments, the hypervisor 120 may set a flag indicating that a page has been exclusively mapped an I/O adapter 106 or may perform all or part of the method 700 for processing a mapping request in an atomic operation. The atomicity may be provided by any known suitable technique, e.g., a lock, a mutual exclusion algorithm (mutex), or by an "ldarx" (Load Double word Reserve Indexed) instruction used in conjunction with a subsequent "stdcx" (Store Double Word Conditional Indexed) instruction.

At various times, it may be desirable to un-map a page exclusively allocated to an I/O adapter 106. If a hypervisor 120 supports a page un-map request, that process may be used. However, if the hypervisor 120 that does not explicitly support a page un-map request, the method 700 may be modified and used in its modified form to un-map a page exclusively allocated to an I/O adapter 106 or other component. In this alternative, the method 700 may be used to establish a new mapping for the page with the read and write bits disabled. This will effectively remove a previously established exclusive mapping. Operations 702, 706, and 706 are unchanged. Operations 708 and 710 are modified to recognize that if a proposed entry contained in the request specifies that the write bit is disabled but the page has been mapped, the page exclusivity flag for the page should be disabled.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 100 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/ or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

While the foregoing is directed to exemplary embodiments, other and further embodiments of the invention may be devised without departing from the basic scope thereof, and the scope thereof is determined by the claims that follow.

What is claimed is:

1. A system, comprising:
a processor;
a memory;
at least one input/output adapter; and
a hypervisor to:
receive a first request to map a first page of the memory for use in a direct memory access (DMA) transfer operation, the first request identifying a first component, wherein a mapping of a page of memory to a component associates the page with the component,
determine that an address of the first page is within a range of addresses allocated for a first logical partition of two or more logical partitions,
determine whether an attribute of the first logical partition limits access to individual pages of the first logical partition to a single component, determine that the first page is available to be mapped when the attribute limits access to individual pages of the first logical partition to a single component, and exclusively map the first page to the first component and set a target exclusive page (TEP) flag to indicate that the first page is exclusively associated with the first component and is unavailable for mapping to a second component when the first page is available to be mapped and the attribute limits access to individual pages of the first logical partition to a single component.

2. The system of claim 1, wherein the first request is received from a device driver on behalf of an input/output adapter and the first component is the input/output adapter.

3. The system of claim 1, wherein the first request is received from an operating system.

4. The system of claim 1, further comprising a DMA unit to process a DMA access request from the first component, wherein the DMA access request specifies the first page.

5. The system of claim 1, further comprising the hypervisor to: reject a second request to map the first page of the memory for use in a DMA transfer operation, the second request identifying the second component.

6. The system of claim 5, wherein the second component is one of an input/output adapter, a flexible service processor, or firmware component.

7. The system of claim 1, wherein the hypervisor determines that that the first page is available to be mapped by reading the target exclusive page flag stored in a target exclusive page table.

8. The system of claim 1, wherein the hypervisor determines that the first page is available to be mapped by reading the target exclusive page flag stored in a translation control entry table.

9. A system, comprising:
a processor;
a memory;
at least one input/output adapter; and
a hypervisor to:
receive a first request to map a first page of the memory for use in a direct memory access (DMA) transfer operation, the first request identifying a first component, wherein a mapping of a page of memory to a component associates the page with the component,
determine that an address of the first page is within a range of addresses allocated for a first logical partition of two or more logical partitions,
determine whether an attribute of the first logical partition limits access to individual pages of the first logical partition to a single component,
determine that the first page is unavailable to be mapped when the attribute limits access to individual pages of the first logical partition to a single component and the first page is exclusively associated with a second component, and
reject the first request to map the first page of memory.

10. The system of claim 9, wherein the first request is received from a device driver on behalf of an input/output adapter and the first component is the input/output adapter.

11. The system of claim 9, wherein the first request is received from an operating system, a firmware component, or a flexible service processor.

12. The system of claim 9, wherein the hypervisor determines that that the first page is unavailable to be mapped by reading a target exclusive page flag stored in a target exclusive page table.

13. The system of claim 9, wherein the hypervisor determines that the first page is unavailable to be mapped by reading a target exclusive page flag stored in a translation control entry table.

14. The system of claim 9, wherein the first request to map the first page of the memory for use in a DMA transfer operation specifies that the DMA operation is a write operation.

15. The system of claim 1, wherein the first request is received from a firmware component.

16. The system of claim 1, wherein the first request is received from a flexible service processor.

17. The system of claim 1, wherein the first request to map the first page of the memory for use in a DMA transfer operation specifies that the DMA operation is a write operation.

18. A system, comprising:
a processor;
a memory;
at least one input/output adapter; and
a hypervisor to:
receive a first request to map a first page of the memory for use in a direct memory access (DMA) transfer operation, the first request identifying a first component, wherein a mapping of a page of memory to a component associates the page with the component,
determine that an address of the first page is within a range of addresses allocated for a first logical partition of two or more logical partitions,
determine whether an attribute of the first logical partition limits access to individual pages of the first logical partition to a single component,
determine that the first page is available to be mapped when the attribute limits access to individual pages of the first logical partition to a single component, and
exclusively map the first page to the first component and set a target exclusive page (TEP) flag to indicate that the first page is exclusively associated with the first component and is unavailable for mapping to a second component when the first page is available to be mapped and the attribute limits access to individual pages of the first logical partition to a single component; and
receive a second request to map a second page of the memory for use in a direct memory access (DMA) transfer operation, the second request identifying a third component, wherein a mapping of a page of memory to a component associates the page with the component,
determine that an address of the second page is within a range of addresses allocated for a second logical partition of the two or more logical partitions,
determine whether an attribute of the second logical partition limits access to individual pages of the second logical partition to a single component,
determine that the second page is unavailable to be mapped when the attribute limits access to individual pages of the second logical partition to a single component and the second page is exclusively associated with a fourth component, and
reject the second request to map the second page of memory.

* * * * *